![United States Patent Office] 3,129,012
Patented Apr. 14, 1964

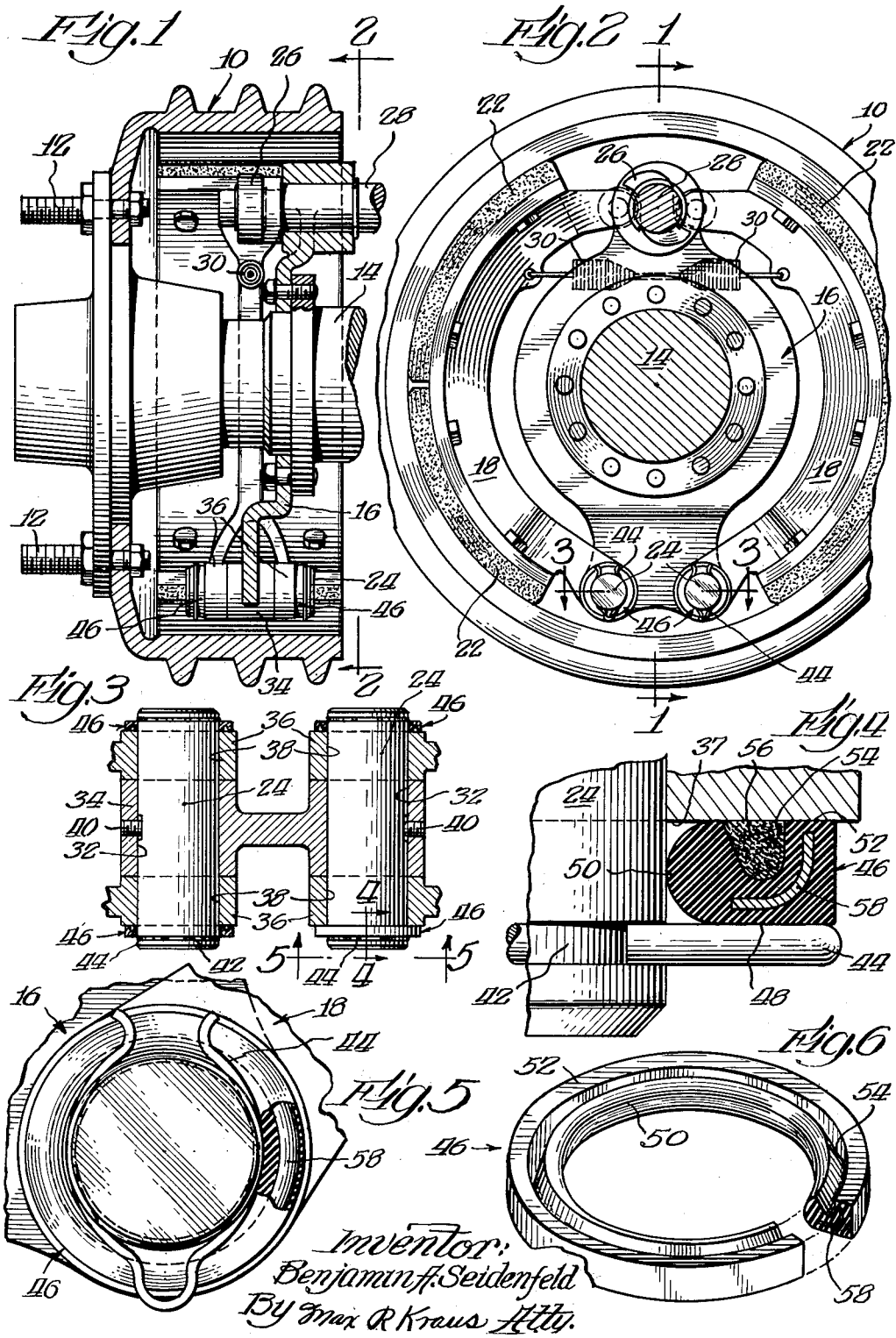

3,129,012
SEALS
Benjamin A. Seidenfeld, Chicago, Ill., assignor to Merit Automotive Parts, Inc., Chicago, Ill., a corporation of Illinois
Filed Nov. 24, 1961, Ser. No. 154,768
1 Claim. (Cl. 277—81)

This invention relates to improvements in seals, particularly for use in connection with anchor pins of brake assemblies.

In present day practice, seals are provided on the anchor pins of brake assemblies; such seals are formed of a metal flanged ring in which is positioned a felt annulus. Such seals have been found to be objectionable in that the felt annulus will pick up the salt or calcium chloride spread on the roads and highways and will corrode the metal, thus, when the brakes are relined the anchor pins are hard to remove and must be driven out by the use of tools and heavy force. Furthermore, such a construction deteriorates and loses its capacity to perform its intended functions.

One of the objects of the present invention is to provide a seal for use with anchor pins of a brake assembly wherein rusting and deterioration of the seal is prevented, and which overcomes the objections inherent in the use of present day seals.

Another object of this invention is to provide a seal which will retain and provide a lubricant for the bearing surfaces.

Another object of this invention is to provide a seal which is sturdy, which has a long life, and which is inexpensive to produce.

Other objects and advantages will become apparent as this description progresses.

In the drawings:

FIGURE 1 is a view partly in cross-section taken on lines 1—1 of FIGURE 2, of a brake assembly, showing this invention therein;

FIGURE 2 is an elevational view taken on lines 2—2 of FIGURE 1;

FIGURE 3 is an enlarged cross-sectional view taken on lines 3—3 of FIGURE 2, showing particularly the anchor pins and the seals applied thereto;

FIGURE 4 is an enlarged view partly in cross-section taken on lines 4—4 of FIGURE 3, showing the construction of the seal forming this invention;

FIGURE 5 is an end view taken on lines 5—5 of FIGURE 3, and

FIGURE 6 is a perspective view of the seal forming this invention, with a portion broken away to show a section thereof.

The brake drum 10 is secured by studs 12 to the wheel, not shown. The axle 14 which supports the wheel also supports a brake spider assembly 16 to which are pivotally secured a pair of brake shoes 18, each having a brake lining 22. The brake shoes 18 are each pivotally attached to the brake spider assembly 16 by means of anchor pins 24, two such anchor pins being shown, one for each brake shoe 18. The brake shoes 18 are actuated by a conventional cam 26 carried on brake cam shaft 28. Springs 30 return the brake shoes after application. All of the foregoing is conventional.

The anchor pin generally indicated at 24 is supported in the opening 32 formed in the bossing 34 of the brake spider assembly 16. The brake shoe 18 has laterally spaced bosses 36 which are positioned on the opposite sides of the bossing 34, and the bosses 36 have alined openings 38 to accommodate the anchor pin 24 and to support the brake shoe spiders 18 for pivotal movement on the anchor pins. Locking screws 40 in the bosses 34 engage anchor pins 24 to prevent rotation of the anchor pins.

It will be readily understood that with each actuation of the brake the brake shoes 18 are pivotally moved on the anchor pins 24. As the bosses 36 are part of the broke shoes 18 the pivoting of the brake shoes 18 rotates or pivots the bosses 36 relative to the anchor pins.

The anchor pin 24 is provided adjacent each of its opposite ends with an annular groove 42 to accommodate a spring locking clip 44, for the purpose of retaining the seal, generally indicated at 46, on the anchor pin inwardly of the clip and against the end walls 37 of the rotatable bosses 36. A seal 46 is mounted on the opposite ends of the anchor pin 24.

The seal 46 comprises an ring-like member having a lower side wall 48 which merges into an inner curvilinear surface 50 so that only a portion of the inner surface makes contact with the anchor pin 24, as best seen in FIGURE 4. The upper side wall 52 of the seal has an annular groove, generally indicated at 54, for the purpose of receiving and retaining a high temperature grease 56. The groove 54 is widest adjacent the inner side wall 52 and decreases in width inwardly. The seal 46 has an annular metal reinforcement member indicated at 58 which is generally L-shaped in section. The seal with the aforementioned metal reinforcement therein is molded of neoprene or any plastic compound. The grease will lubricate the bearing surface of the anchor pin 24.

It will be understood that various changes and modifications may be made from the foregoing without departing from the spirit and scope of the appended claim.

What is claimed is:

A seal to be supported on the anchor pin of a brake assembly, which brake assembly includes a rotatable boss having an end wall, said seal being molded of a plastic compound and having spaced upper and lower side walls merging with an inner curvilinear wall, said curvilinear wall having a bearing surface positioned approximately centrally between said upper and lower side walls and adapted to engage only at said bearing surface with the anchor pin, an L-shaped reinforcing member wholly within said seal and between said spaced upper and lower side walls, said upper side wall adapted to engage the end wall of the rotatable boss and said upper side wall having an annular recess for accommodating a lubricant so that the lubricant contacts the end wall of the rotatable boss.

References Cited in the file of this patent
UNITED STATES PATENTS

| | | |
|---|---|---|
| 2,593,410 | Buckendale | Apr. 22, 1952 |
| 2,607,615 | Katcher | Aug. 19, 1952 |
| 2,697,623 | Mosher | Dec. 21, 1954 |

FOREIGN PATENTS

| | | |
|---|---|---|
| 544,732 | Great Britain | Apr. 24, 1942 |